(12) United States Patent
Schilling et al.

(10) Patent No.: US 8,359,987 B2
(45) Date of Patent: Jan. 29, 2013

(54) DEPTH ADJUSTMENT ASSEMBLY FOR A DISC OPENER OF AN AGRICULTURAL IMPLEMENT

(75) Inventors: Robin B. Schilling, Darfield (CA); Matthew S Naylor, Saskatoon (CA); Terrance A Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 13/461,512

(22) Filed: May 1, 2012

(65) Prior Publication Data

US 2012/0210921 A1 Aug. 23, 2012

Related U.S. Application Data

(62) Division of application No. 12/621,959, filed on Nov. 19, 2009, now Pat. No. 8,186,287.

(51) Int. Cl.
| | |
|---|---|
| A01B 5/00 | (2006.01) |
| A01B 7/00 | (2006.01) |
| A01B 21/00 | (2006.01) |
| A01C 5/00 | (2006.01) |
| A01C 7/18 | (2006.01) |

(52) U.S. Cl. ............................ 111/69; 111/167; 172/578
(58) Field of Classification Search .................... 111/52, 111/69, 120–129, 149, 152–169, 190–194; 172/518, 578
See application file for complete search history.

(56) References Cited

U.S. PATENT DOCUMENTS

| | | | |
|---|---|---|---|
| 3,172,968 A | 3/1965 | Arendt | |
| 4,408,551 A | 10/1983 | Keller et al. | |
| 4,760,806 A | 8/1988 | Bigbee | |
| 4,760,860 A | 8/1988 | Bigbee et al. | |
| 4,796,550 A | 1/1989 | Van Natta et al. | |
| 4,995,325 A | 2/1991 | Herriau et al. | |
| 5,481,990 A | 1/1996 | Zacharias | |
| 5,487,631 A | 1/1996 | Child | |
| 5,595,130 A | 1/1997 | Baugher et al. | |
| 5,673,757 A | 10/1997 | McDonald | |
| 5,887,664 A | 3/1999 | Whalen et al. | |
| 5,904,107 A | 5/1999 | Kester | |
| 6,105,251 A | 8/2000 | Payen | |
| 6,321,667 B1 | 11/2001 | Shoup | |
| 6,659,193 B1 | 12/2003 | Best et al. | |
| 7,481,278 B1 | 1/2009 | Pomedli | |
| 7,487,732 B2 | 2/2009 | Johnston et al. | |
| 2008/0006189 A1 | 1/2008 | Johnston et al. | |
| 2010/0107942 A1 | 5/2010 | Schilling | |

FOREIGN PATENT DOCUMENTS

| | | |
|---|---|---|
| CN | 200989393 | 1/2009 |
| EP | 0555745 A2 | 8/1993 |

*Primary Examiner* — Christopher J. Novosad
(74) *Attorney, Agent, or Firm* — Rebecca Henkel

(57) ABSTRACT

A disc hub assembly includes a shouldered spindle that is secured to a disc opener frame and to which a depth adjustment arm and a gauge wheel arm are connected. The disc hub, to which a ground opener disc is mounted, is disposed on the spindle in a manner that allows the disc to rotate around the spindle. A gauge wheel is connected to the gauge wheel arm. When the depth adjustment arm is rotated between depth setting positions the gauge wheel arm is also rotated. As the gauge wheel is connected to the gauge wheel arm, rotation of the gauge wheel arm causes rotation of the gauge wheel. The depth adjustment arm is spring biased into engagement with an arc of notches on the disc opener frame. The notches define a range of positions at which the depth adjustment arm may be positioned.

2 Claims, 9 Drawing Sheets

DEPTH ADJUSTMENT ASSEMBLY FOR A DISC OPENER OF AN AGRICULTURAL IMPLEMENT

CROSS-REFERENCES TO RELATED APPLICATIONS

This Patent Application is a Divisional of co-pending U.S. patent application Ser. No. 12/621,959, filed on Nov. 19, 2009 entitled, "Depth Adjustment For A Disc Opener Of An Agricultural Implement" and having Robin B. Schilling, Matthew S. Naylor, and Terrance A. Friggstad as the Applicants.

BACKGROUND OF THE INVENTION

The present invention relates generally to ground opener units for an agricultural implement and, more particularly, to a depth adjustment assembly for setting the depth of a coulter or disc of a disc opener unit.

One type of planting implement is commonly equipped with one or more rows of disc or coulters carried by a tool bar, commonly referred to as a disc drill, which is towed by a tractor. Typically, an air cart, which holds seed and/or fertilizer, is also towed by the tractor and pneumatically supplies the individual disc openers with seed and/or fertilizer. The disc openers are attached to the disc drill frame by individualized arms or linkages which allow the disc openers to operate independently of another. This "independence" allows the discs to independently respond to changes in terrain and field obstructions.

Each disc has a generally flat construction that is rotated a few degrees, e.g., 7 degrees, about a vertical axis so that as the disc is pulled through the soil the leading surface of the disc displaces soil and creates a furrow in the soil. Downward pressure on the disc is provided by a spring or hydraulic cylinder to hold the disc at a desired furrowing depth, e.g., desired seeding depth. The depth at which the disc cuts the furrow into the soil is controlled by a gauge wheel that runs in relative close proximity to the disc. In addition to its depth controlling function, for some disc drills, the placement of the gauge wheel close to the disc also assists in keeping the disc surface clean of soil, mud, or debris buildup. Also, the gauge wheel rides over the soil displaced by the disc as the furrow is being cut to prevent the displaced soil from being thrown.

The disc cuts a furrow or trench in the soil into which seed and/or fertilizer is deposited. The seed and/or fertilizer is dropped through a tube into the trench which the disc holds the trench open on one side and a disc scraper blade holds it open on the opposite side. The trench walls then collapse onto the seed and/or fertilizer when the disc and scraper blade pass. A trailing wheel then packs the soil atop the seed and/or fertilizer. Most disc drills include a spring that is used to adjust the amount of packing pressure applied by the trailing (packer) wheel.

SUMMARY OF THE INVENTION

The present invention is directed to a disc hub assembly and method of setting the furrow cutting depth of a disc opener. The disc hub assembly includes a shouldered spindle that is secured to a disc opener frame or mounting member and to which a depth adjustment arm and a gauge wheel arm are connected. The disc hub, to which the ground opener disc is mounted, is disposed on the spindle in a manner that allows the disc to rotate around the spindle. A gauge wheel is connected to the gauge wheel arm. The spindle effectively operates as a crankshaft. In this regard, when the depth adjustment arm is rotated between depth setting positions the gauge wheel arm is also rotated. As the gauge wheel is connected to the gauge wheel arm, rotation of the gauge wheel arm causes rotation of the gauge wheel. In one preferred embodiment, the range of the furrow depth is 3.2 mm to 87 mm deep. The depth adjustment arm includes a handle that is spring biased into engagement with an arc of notches on the disc opener frame. The notches define a range of positions at which the depth adjustment arm may be positioned to set the depth of the disc.

The disc is mounted to the spindle by a bearing. The spindle includes a shoulder against which the bearing is slid during assembly of the disc hub assembly. The inner bearing race is securely clamped against this spindle shoulder by the gauge wheel arm. In this regard, the invention avoids the bearing from being loose or tight on the spindle.

It is therefore an advantage of the invention to provide for precise positioning of the bearing of the disc hub assembly onto the spindle.

The invention also advantageously sets the force required to move the depth adjustment arm between settings to a user-friendly and consistent level.

The depth adjustment arm preferably has a relatively narrow profile when compared to depth adjustment arms of conventional ground opener units. The reduced width of the depth adjustment arm reduces the overall width of the ground opener unit; thereby allowing for greater ground opener density or greater ground opener spacing.

Therefore, in accordance with one aspect of the invention, a disc hub assembly for a disc opener apparatus having a coulter is provided. The disc hub assembly includes a spindle having a first end and a second end. A depth adjustment arm is coupled to the first end of the spindle and is adapted to be selectively positioned at one of a number of depth setting positions. Rotation of the depth adjustment arm causes rotation of the spindle. A depth adjustment handle is coupled to the depth adjustment arm and is configured to disengage the depth adjustment arm from a selected depth setting position and move the depth adjustment arm to a new depth setting position. A gauge wheel arm is coupled to the second end of the spindle and is configured to rotate with rotation of the spindle. The gauge wheel arm has a first end coupled to the second end of the spindle and further has a second end to which a gauge wheel spindle is connected. The gauge wheel arm is adapted to interface with a gauge wheel such that rotation of the spindle causes either a lowering or a raising of the depth setting gauge wheel relative to the coulter.

In accordance with another aspect of the invention, a disc opener apparatus includes a frame (or bracket) adapted to be mounted to a tool bar. The apparatus further includes a series of radially spaced notches formed on a portion of the frame and a disc adapted to cut a furrow into the surface as well as a gauge wheel. A depth adjustment assembly is mounted to the frame and is adapted to set the position of the gauge wheel at one of a number of selectable positions defined by the series of radially spaced notches. The depth adjustment assembly includes a spindle having a body disposed between a first end and a second end. The disc is supported by the body of the spindle in a manner that allows rotation of the disc about the spindle body. A depth adjustment arm is coupled to the first end of the spindle and is adapted to be selectively engaged with the notches. Rotation of the arm causes rotation of the spindle. The depth adjustment handle is spring biased into a selected notch, and can be disengaged and rotated to a new notch. A gauge wheel arm is coupled to the second end of the spindle and is configured to rotate with rotation of the spindle. The gauge wheel arm has a first end coupled to the second end of the spindle and further has a second end. A gauge wheel spindle is coupled to the second end of the gauge wheel arm and is adapted to be connected to the gauge wheel such that rotation of the spindle causes a lowering or a raising of the gauge wheel so as to set a furrowing depth of the disc.

According to a further aspect of the invention, a spindle for a gauge wheel assembly of a disc opener unit for a disc drill apparatus is provided. The spindle has an elongated body disposed between a first end adapted to engage a gauge arm of the gauge wheel assembly and a second end adapted to engage a depth adjustment arm of the gauge wheel assembly. The spindle further includes a shoulder extending from an exterior surface of the body. The shoulder is constructed to limit axial movement of a bearing of the disk assembly that is placed on the body. A grease channel may be formed in the elongated body to deliver grease to the bearing and/or body of the spindle.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
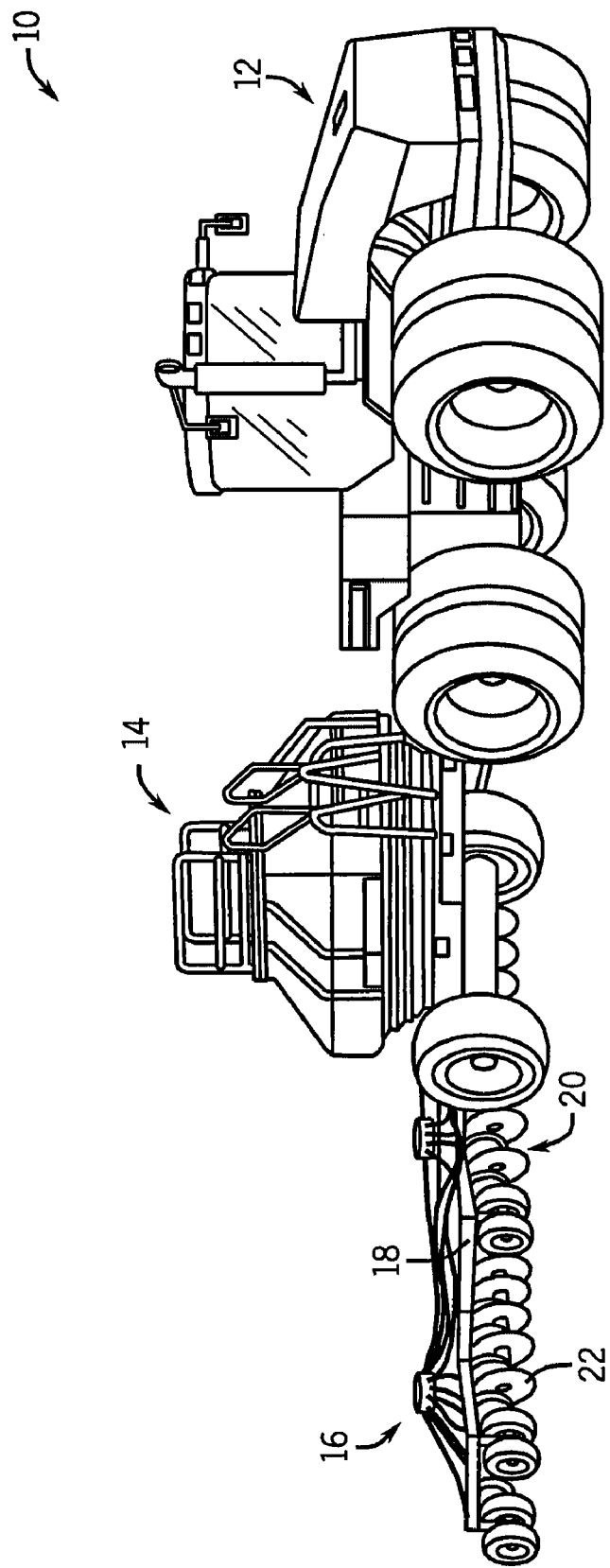
FIG. 1 is a pictorial view of an agricultural system generally comprised of tractor, an air cart, and a disc drill having a set of disc openers.

Referring now to the drawings, and more particularly to FIG. 1, an agricultural seeding system 10 is shown and, as known in the art, is generally comprised of a tractor 12, an air cart 14, and a seeder 16. The air cart 14 and the planter 16 are hitched to the tractor 12 in a conventional manner. The planter 16 includes a tool bar 18 to which a set of disc opener units 20 are coupled. The disc opener units 20 each include a disc 22 designed to cut a furrow into the soil. As known in the art, the air cart 14 pneumatically delivers seed and/or fertilizer to a set of delivery tubes (not shown) of the seeder 14 whereupon the seed and/or fertilizer is deposited in seed trenches or furrows cut by the discs 22.

Figure 2:
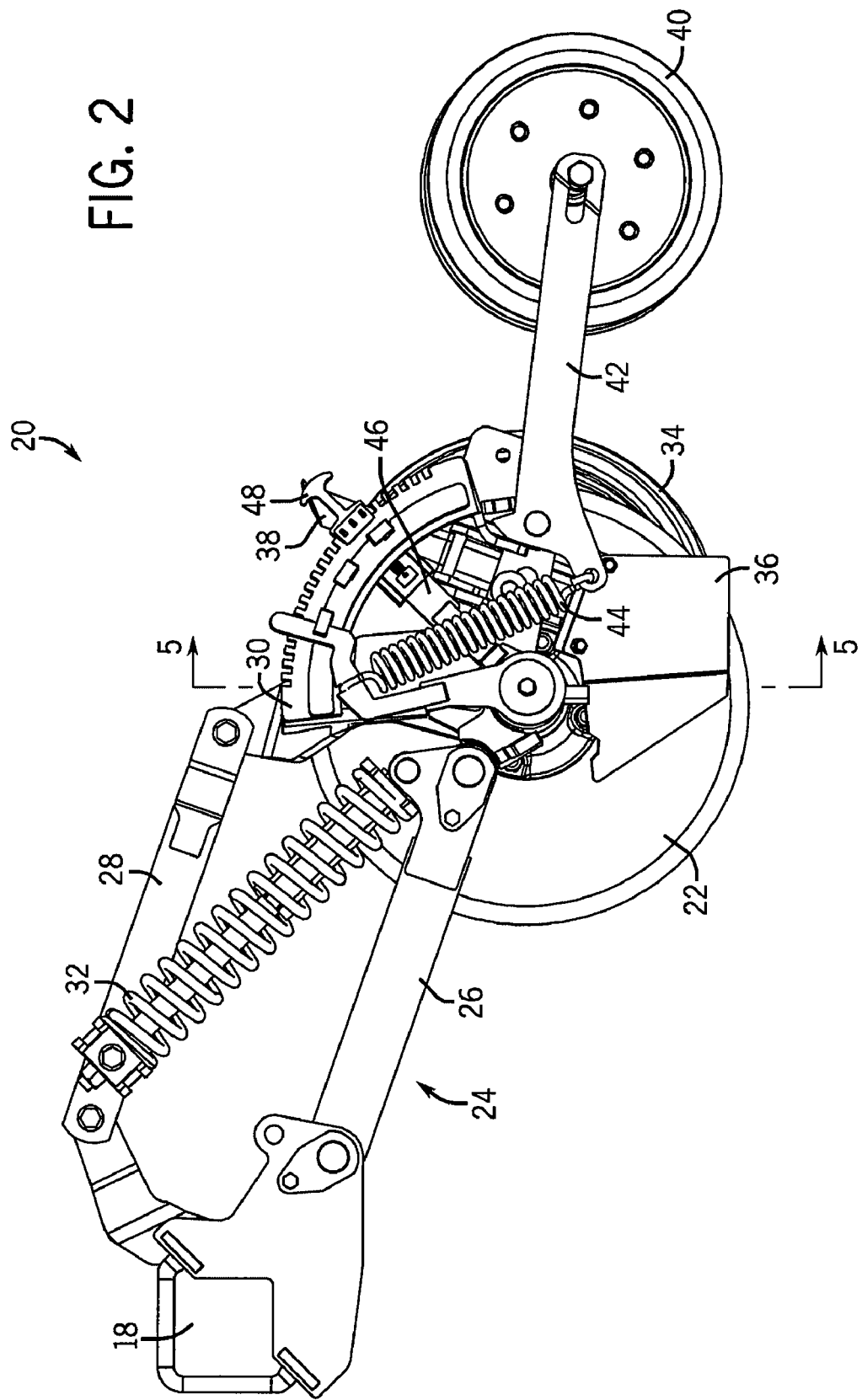
FIG. 2 is a side elevation view of a disc opener unit of the disc drill of FIG. 1.

An exemplary disc opener unit 20 is shown in FIG. 2. Each disc opener unit 20 includes a linkage assembly 24 that in the illustrated unit includes links 26, 28 that are coupled to the tool bar 18 in a known manner at one end and connected to an opener frame 30 at the opposite end. The opener unit 20 includes a spring 32 that applies downward pressure on the disc 22. Alternately, a hydraulic cylinder may be used to apply such downward pressure. Disc penetration is controlled by a gauge wheel 34 that is positioned in relative close proximity to the disc 22. In addition to controlling the penetration depth of the disc 22 the gauge wheel 34 also helps in keeping the adjacent side of the disc 22 clear of debris. A scraper blade 36 is provided on the opposite side of the disc 22 to keep the leading face of the disc 22 clear of soil, mud, and debris. In one preferred embodiment, the disc 22 is angled at an offset of approximately 7 degrees from vertical; although, different orientations are contemplated. The leading side of the disc 22 displaces soil and creates a furrow in the soil as the disc 22 is pulled through the soil by the tractor 12. In addition to providing a scraping function the scraper blade 36 also helps to hold the furrow open as seed and/or fertilizer is deposited into the furrow.

The disc opener unit 20 also carries a seed tube or boot 38 that is flow-coupled to the air cart 14. As known in the art, seed and/or fertilizer is provided to the seed tube 38 which drops the seed and/or fertilizer into the furrow. A trailing wheel 40, coupled to the frame 30 by arm 42, packs the furrow after the seed and/or fertilizer has been deposited. The amount of packing pressure applied by the trailing wheel 40 is controlled by a spring 44; although, it is contemplated that other types of biasing devices may be used.

Figure 3:
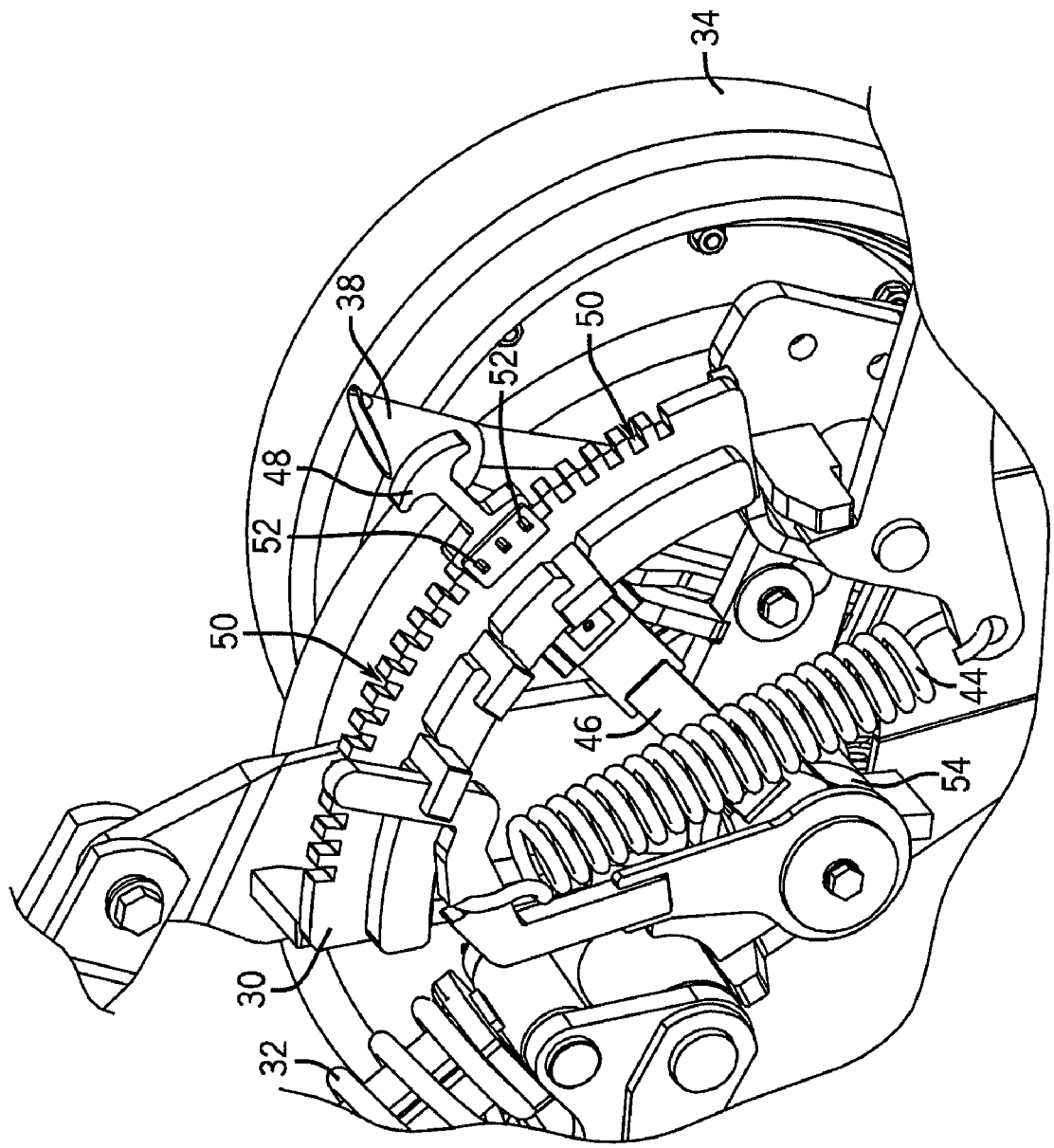
FIG. 3 is an enlarged isometric view of a portion of the disc opener unit of FIG. 2.

As noted above, the gauge wheel 34 controls the penetration depth of the disc 22. The gauge wheel 34 may be raised or lowered by rotation of a depth adjustment arm 46. Arm 46, which includes a generally T-shaped handle 48, may be rotated by a user pulling upward on handle 48. As shown in FIG. 3, the frame 30 includes an arc of notches 50 that define a range of discrete engagement points at which the handle 48 may be positioned. In one preferred embodiment, the notches 50 allow the gauge wheel 34 to set the penetration depth between 3.2 mm and 87 mm. The handle 48 has teeth 52 that are received by a selected number of the notches 50 to position the handle 48, and thus the arm 46, at a desired position. The arm 46 is coupled to a spindle 54 that as described below also carries the gauge wheel 34 and the disc 22. As such, rotation of the arm 46 between the discrete positions varies the position of the gauge wheel 34 and thus the penetration depth of the disc 22.

Figure 4:
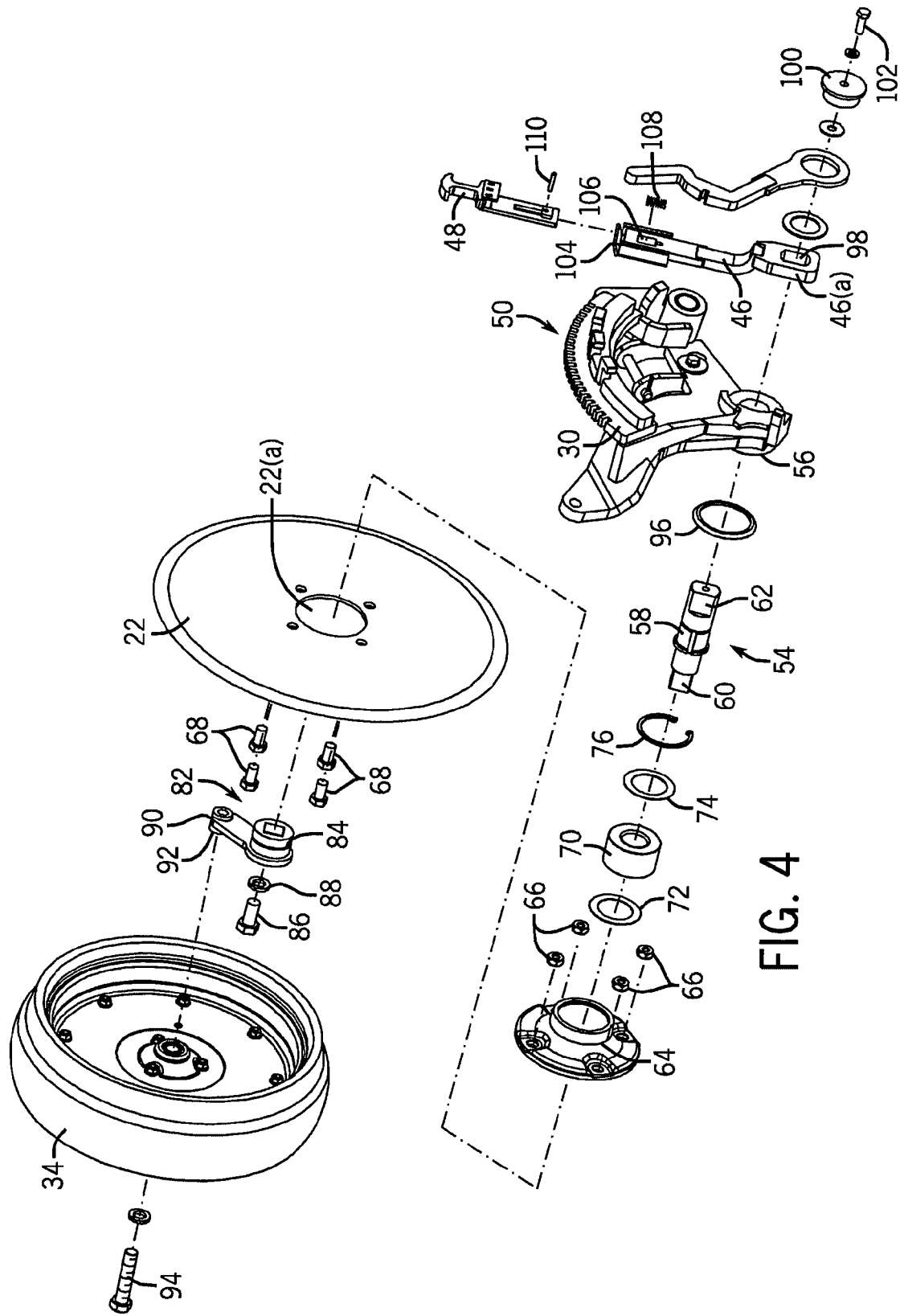
FIG. 4 is a exploded view of the disc opener unit of FIG. 2.
Figure 8:
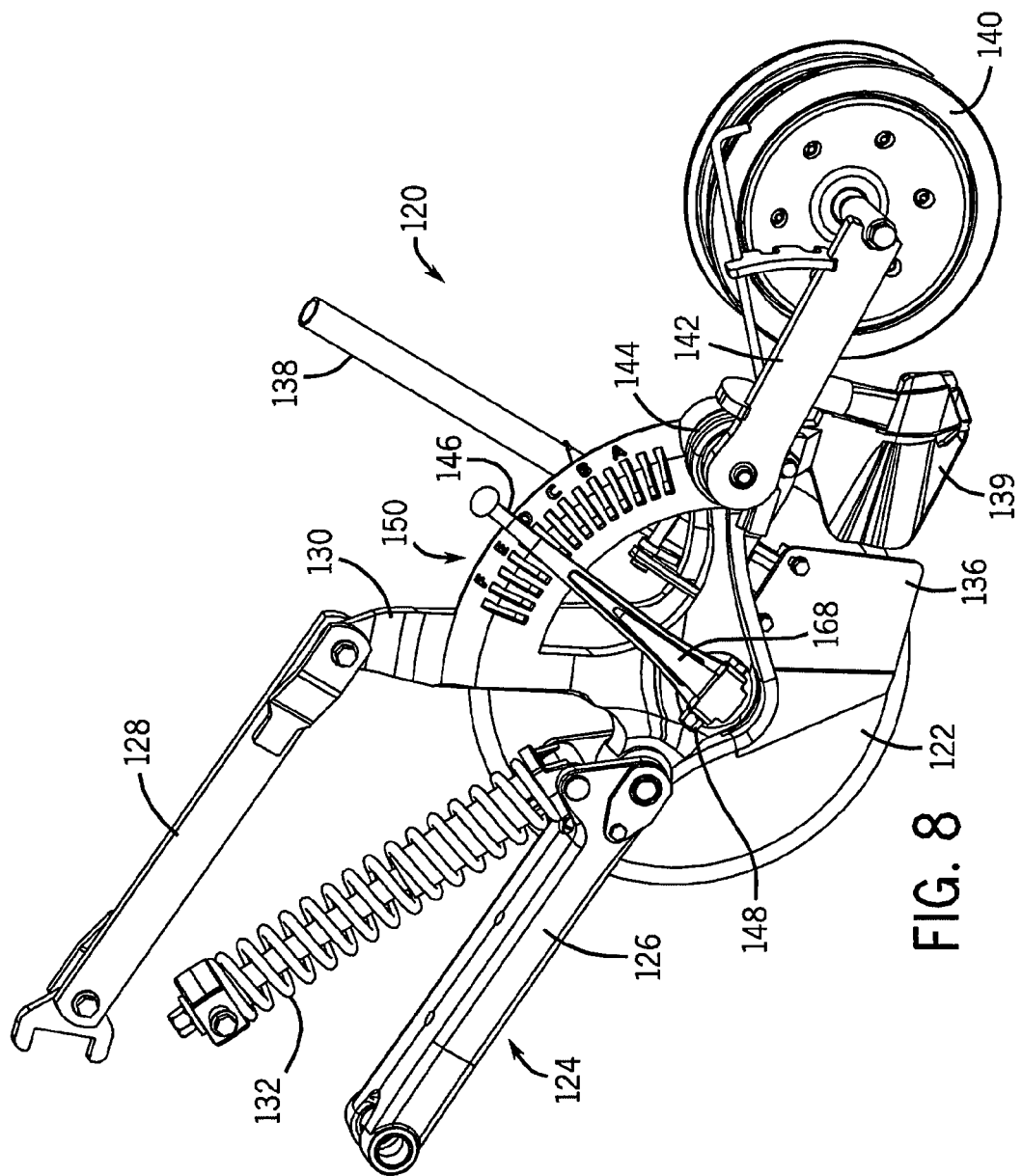
FIG. 8 is a side elevation view of a disc opener unit according to another embodiment of the invention.

To better illustrate the design of the disc opener unit 20 reference is now made to FIG. 4, which provides an exploded view of a portion of the disc opener unit 20. The frame 30 includes a generally cylindrical sleeve 56 into which spindle 54 is received. With additional reference to FIG. 8, the spindle has a body 58 defined between a first end 60 and a second end 62. The disc 22 is mounted to a hub 64 using nuts 66 and bolts 68 in a conventional manner. The hub 64 has a bearing 70 pressed into it with a pair of washers 72, 74 and a snap ring 76 operative as a retainer. While different types of bearings are contemplated, bearing 70 preferably has a split inner race. Each inner half is placed from each side and clamped together. When clamped, a correct internal clearance is provided. The hub 64, bearing 70, washers 72, 74, and snap ring 76 collectively define a hub assembly 78 that is slid onto end 60 of the spindle 54. As best shown in FIG. 8, the spindle 54 has a shoulder 80 that provides a defined stop for the hub assembly 78. In this regard, the hub assembly 78 is slid onto the spindle 54 until the inner race of the bearing abuts the shoulder 80.

As described above, the disc 22 is fastened to the hub 64. It is understood that the disc 22 could be mounted to the hub before or after the hub assembly is placed onto the spindle 54. With the disc 22 secured to the hub 64 and the hub assembly 68 placed over the first end 60 of the spindle 54, a gauge arm 82 may be secured to the first end 60 of the spindle 54. More particularly, the gauge arm 82 has a first end 84 that is passed through central opening 22(a) of the disc 22 and the hub assembly 78 into engagement with the first end 60 of the spindle 54. In one preferred embodiment, the first end 60 of the spindle 54 and the first end 84 of the gauge arm 82 have complimentary shapes, e.g., square, to facilitate a quick and correct coupling. A bolt 86 and washer 88 are then used to secure the gauge arm 82 to the spindle 54.

The second end 90 of the gauge arm 82 is coupled to a gauge wheel spindle 92 to which the gauge wheel 34 is mounted using bolt 94. The gauge wheel 34 is mounted to the gauge wheel spindle 92 in a manner that allows the gauge wheel 34 to rotate around the gauge wheel spindle 92. Preferably, after the disc 22, hub assembly 78 and gauge wheel 34 have been secured to the spindle 54, the second end 62 is passed through a v-ring seal 96 and sleeve 56 of frame 30. The second end 62 of the spindle 54 extends past the sleeve 56 and passes through an opening 98 formed in a lower end 46(a) of the depth adjustment arm 46. A collar 100 together with a bolt 102 are used to secure the depth adjustment arm 46 to the spindle 54 and secure the spindle 54 to the frame 30 (together with bolt 94 described above).

As further shown in FIG. 4, the depth adjustment arm 46 includes an upper end 104 having a pocket 106 for a compression spring 108. The upper end 104 is secured to the depth adjustment handle 48 by a roll pin 110. The compression spring 108 functions to keep the teeth 52 of the handle 48 engaged with selected notches 50. In this regard, a user must pull on the handle 48 sufficiently to overcome the compressive force of the spring 108 to disengage the teeth 52 from the notches 48 and rotate the arm 46 to a new position along the arc of notches 50. Once the pulling force is removed, the compressive force of the spring 108 draws the handle 48 toward the spindle 54 (axis of rotation for the disc 22) and engages the teeth 52 with the notches 50.

Figure 5:
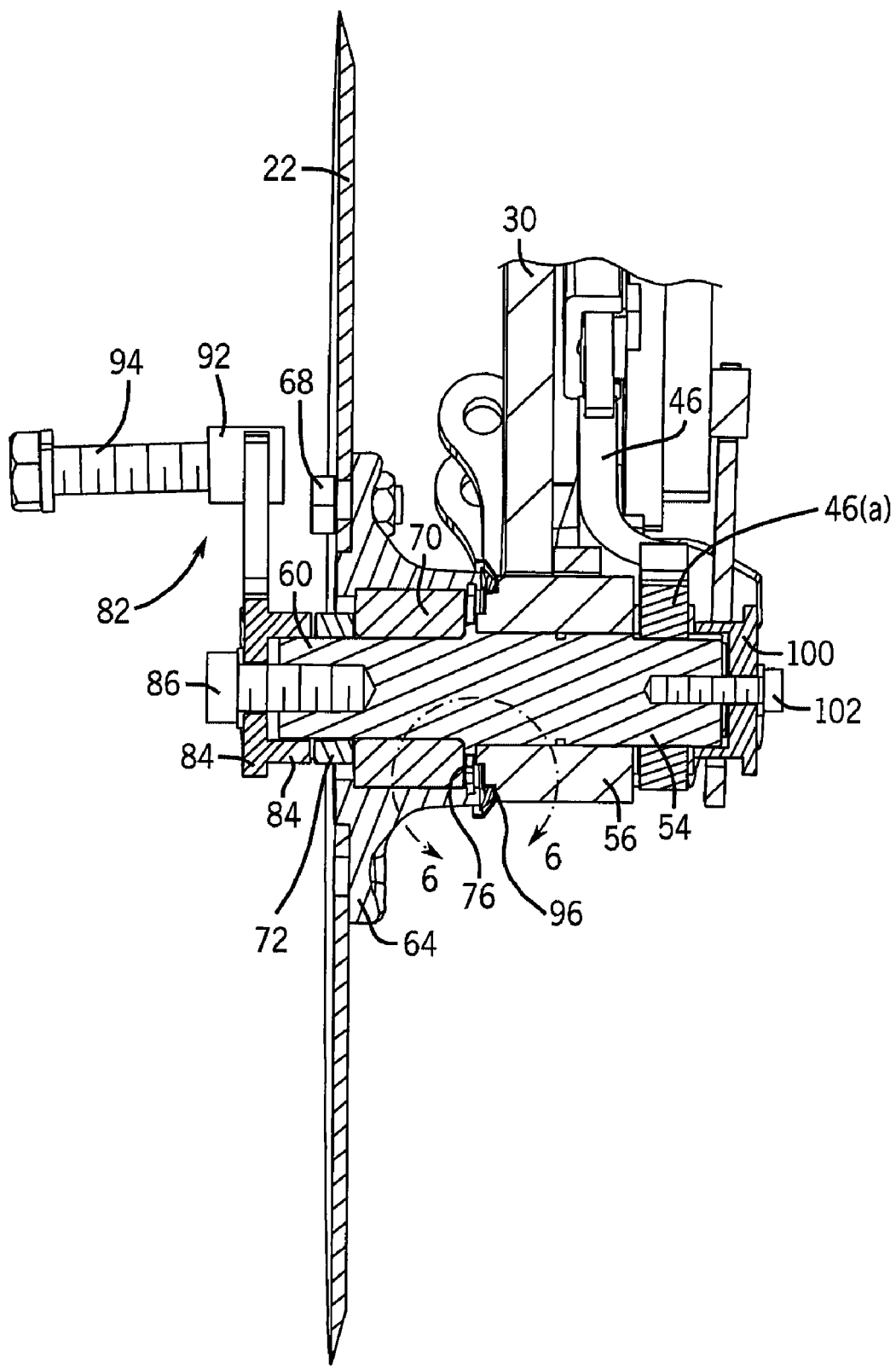
FIG. 5 is a section view of the disc opener unit taken along line 5-5 of FIG. 2.

FIG. 5 provides a section view of the disc opener unit 20 taken along line 5-5 of FIG. 2. As illustrated, the spindle 54 defines an axis of rotation for the disc 22 as well as the gauge wheel arm 82 and the depth adjustment arm 46. As further illustrated in FIG. 5, the gauge wheel spindle 92 is offset from spindle 54 but rotates with spindle 54. In this regard, the spindle 54 acts as a crankshaft for the gauge wheel arm 82 such that as the gauge wheel arm 82 is rotated the gauge wheel 34 is rotated albeit along an axis offset but parallel to the axis of rotation for the spindle 54.

Figure 6:
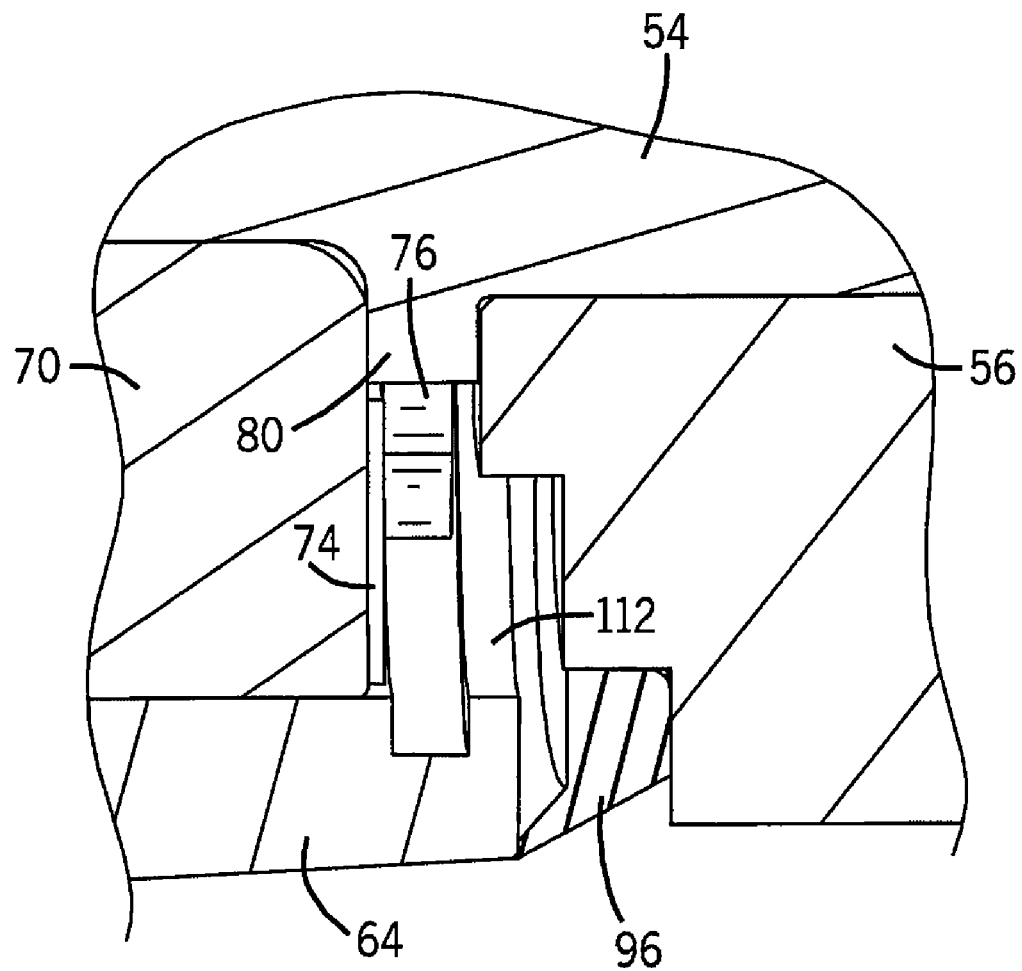
FIG. 6 is an enlarged section view of the disc opener unit taken along line 6-6 of FIG. 5.
Figure 7:
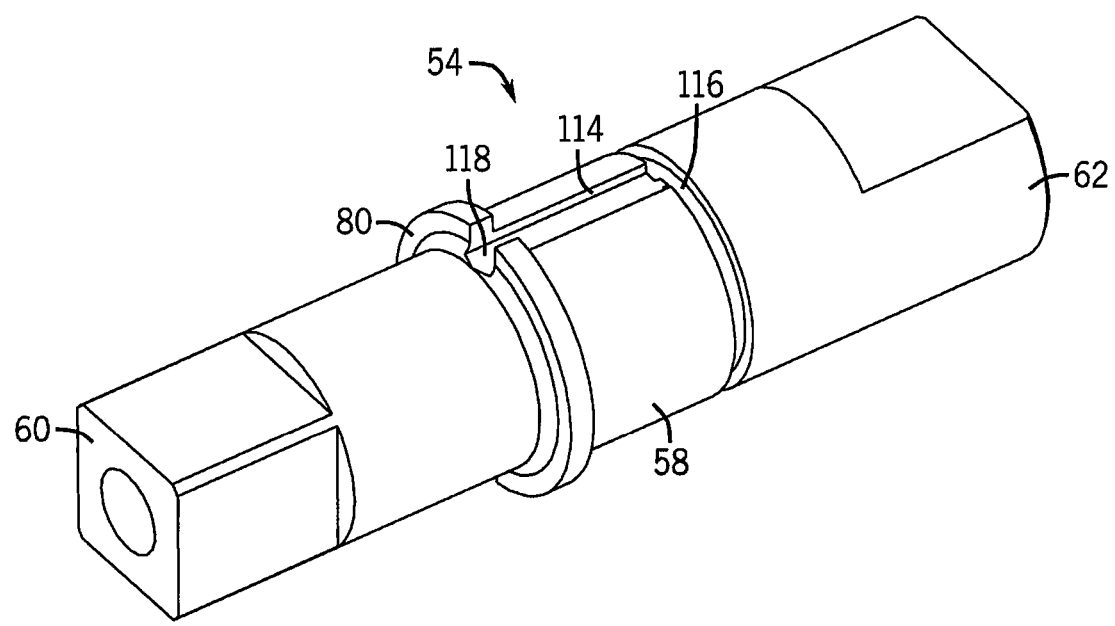
FIG. 7 is an isometric view of the spindle of the disc hub assembly of FIG. 4.

As noted above and with additional reference to FIG. 6, a v-ring seal 96 is provided that is used to create a grease pocket, illustrated at reference numeral 112, between the face of the bearing 70 and the frame 30. The grease zerk is located on the outside of the frame 30 and lubricates rotation of the spindle 54 when a depth adjustment is made. Referring again to FIG. 7, a grease channel 114 is formed along the body 58 of the spindle 54. The grease channel 114 is formed generally parallel to the long axis of the spindle body 58. An annular grease grove 116 is formed in the elongated body 58 between the grease channel 114 and end 62 of the spindle 54. As further illustrated in FIG. 7, the grease channel 114 communicates with a cutout 118 formed in the shoulder 80 and is positioned between the shoulder 80 and end 62 of the spindle 54.

FIG. 8 shows a disc opener unit 120 according to another embodiment of the present invention. This disc opener unit 120 includes a linkage assembly 124 that in the illustrated unit includes links 126, 128 that are coupled to a tool bar (not shown) in a known manner at one end and connected to an opener frame 130 at the opposite end. The opener unit 120 includes a spring 132 that applies downward pressure on disc 122. The amount of down pressure force applied by spring 132 can be varied by a rockshaft assembly (not shown) that is coupled to the free end of the spring 132. Alternately, a hydraulic cylinder may be used to apply such downward pressure. Disc penetration is controlled by a gauge wheel (not shown) that is positioned in relative close proximity to the disc 122. In addition to controlling the penetration depth of the disc 122 the gauge wheel also helps in keeping the adjacent side of the disc 122 clear of debris. A scraper blade 136 is provided on the opposite side of the disc 122 to keep the leading face of the disc 122 clear of soil, mud, and debris. In one preferred embodiment, the disc 122 is angled at an offset of approximately 7 degrees from vertical; although, different orientations are contemplated. The leading side of the disc 122 displaces soil and creates a furrow in the soil as the disc 122 is pulled through the soil by a tractor. In addition to providing a scraping function the scraper blade 136 also helps to hold the furrow open as seed and/or fertilizer is deposited into the furrow.

The disc opener unit 120 carries a seed tube or boot 138 that is flow-coupled to the air cart 14 and may optionally include a secondary seed boot 139. As known in the art, seed and/or fertilizer is provided to the seed tube 138 which drops the seed and/or fertilizer into the furrow. A trailing wheel 140, coupled to the frame 130 by arm 142, packs the furrow after the seed and/or fertilizer has been deposited. The amount of packing pressure applied by the trailing wheel 140 is controlled by a torsion spring 144; although, it is contemplated that other types of biasing devices may be used.

As noted above, the gauge wheel controls the penetration depth of the disc 122. The gauge wheel may be raised or lowered by rotation of a depth adjustment arm 146. Arm 146 is pivotably coupled to a spindle (not shown), by a pivot pin 148, about which the disc 122 rotates as it is pulled through the soil. This connection allows the arm 146 to be laterally hinged away from the frame 130 and then rotated to various depth setting positions defined by notches 150 formed in an arc on the frame 130. Each notch corresponds to a different gauge wheel position and thus penetration depth for the disc 122. In one preferred embodiment, the notches 50 allow the gauge wheel 34 to set the penetration depth between 3.2 mm and 87 mm.

Figure 9:
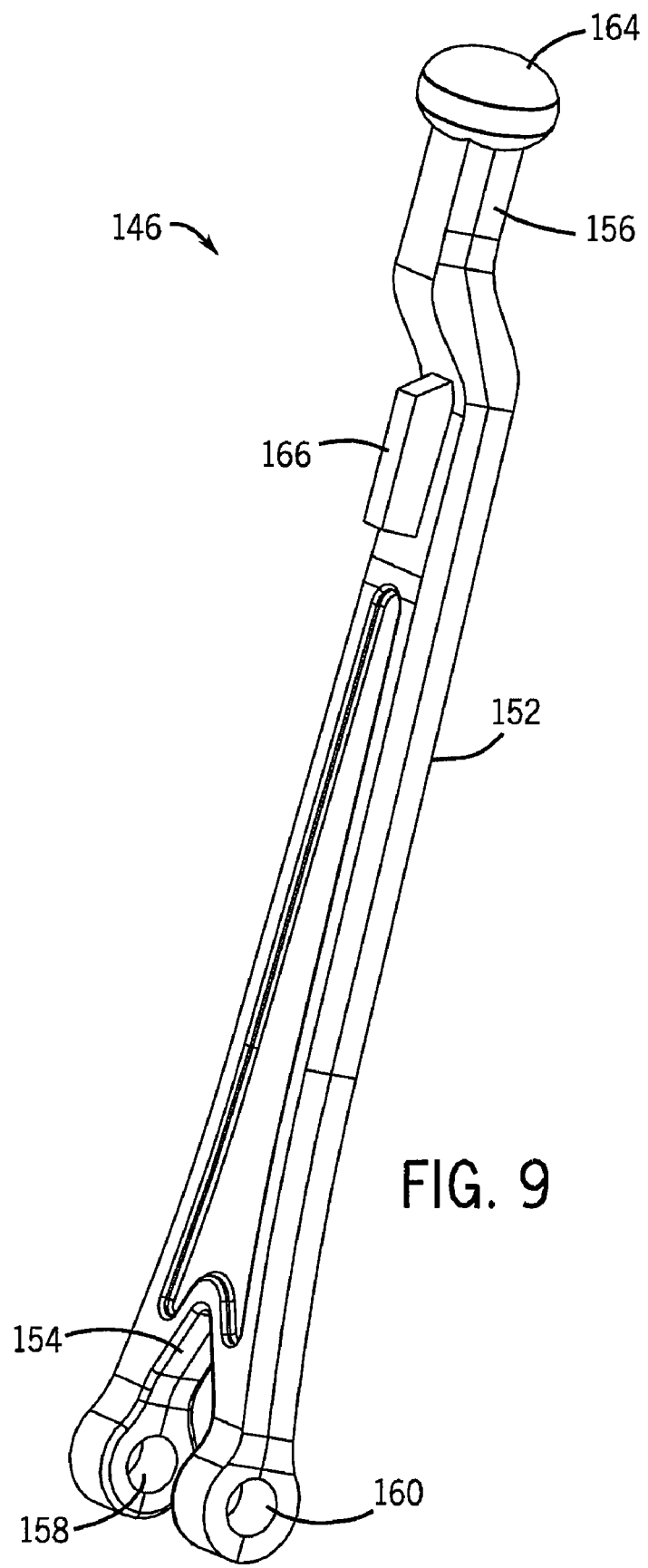
FIG. 9 is an isometric view of a depth adjustment arm for the disc opener unit shown in FIG. 8.

As shown in FIG. 9, the adjustment arm 146 has an arm body 152 generally defined between a lower end 154 and an upper end 156. The lower end 154 includes a pair of eyelets 158, 160 that align with a hole (not shown) in the end of the spindle. Once aligned, pin 148 may be inserted into the eyelets 158,160 and through the hole, and then fastened to the spindle by a bolt 162 or other type of fastener. The upper end 156 of the arm 146 includes a bulbous member 164 operative as a gripping member or handle to allow a user to manipulate the arm 146. A tooth 166 laterally extends from the body 152 and is designed to fit in each of the notches 150 formed on the frame 130. The reception of the tooth 166 in a notch 150 firmly secures the adjustment arm 146 in place. In one preferred embodiment, a biasing member 168, FIG. 8, is also secured to the end of the spindle by pin 148, and exerts a pushing force onto the body 152 of the adjustment arm 146. The bias of member 168 must be overcome to hinge the arm 146 away from the frame 30 and disengage the tooth 166 from a notch 150. In this regard, the biasing member 168 assists in keeping the tooth 166 engaged with a notch 150. In a preferred embodiment, the biasing member 168 is a flat spring.

It will be appreciated that the present invention provides a disc hub assembly having a narrower depth adjustment arm thereby reducing the width of the disc opener thereby allowing for tighter opener spacing and improved debris flow. Additionally, the invention provides a spindle for the depth adjustment assembly of a disc opener unit that sets the position of the disc hub bearing rather than relying upon the tightening of a nut or bolt to set the clearance. By providing a well defined position for the bearing, the invention avoids the bearing being mounted too loosely or over-tightened, which can lead to difficulty in making a depth adjustment, i.e., rotating the depth adjustment arm.

Many changes and modifications could be made to the invention without departing from the spirit thereof. The scope of these changes will become apparent from the appended claims.

We claim:

1. A spindle for a gauge wheel assembly of a disc opener unit for a disc drill apparatus, comprising:
    an elongated body disposed between a first end adapted to engage a gauge arm of the gauge wheel assembly and a second end adapted to engage a depth adjustment arm of the gauge wheel assembly;
    a frame receiving the spindle therethrough, the frame including at least one notch formed therein;
    a shoulder extending from an exterior surface of the body, the shoulder constructed to limit axial movement of a bearing of the gauge wheel assembly that is placed on the body; and
    a handle having at least one tooth projecting therefrom and being operatively connected to an outer end of the depth adjustment arm, the handle being moveable between a first position wherein the tooth is disengaged from at least one notch in the frame such at the depth adjustment arm is free to be selectively positioned at one of a number of depth setting positions and a second position; wherein the depth adjustment arm further includes a tooth adapted to be received in each of the notches to position the depth adjustment arm at a selected depth setting position.

2. The spindle of claim 1 further comprising:
    a grease channel formed in the elongated body to deliver grease to the bearing, and
    wherein the shoulder is positioned between the first end of the elongated body and the midpoint of the elongated body, and wherein the grease channel is formed between the shoulder and the second end of the elongated body.

\* \* \* \* \*